US008818678B2

(12) United States Patent
Salinger et al.

(10) Patent No.: US 8,818,678 B2
(45) Date of Patent: Aug. 26, 2014

(54) METHOD FOR PREVENTING ACTIVATION OF RESUME FUNCTION IN A CRUISE CONTROL SYSTEM

(75) Inventors: Jeremy A. Salinger, Southfield, MI (US); William G. Herbert, Bloomfield Hills, MI (US); James N. Nickolaou, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 834 days.

(21) Appl. No.: 12/862,750

(22) Filed: Aug. 24, 2010

(65) Prior Publication Data

US 2012/0053807 A1 Mar. 1, 2012

(51) Int. Cl.
*G06F 7/00* (2006.01)
(52) U.S. Cl.
USPC .......................................................... 701/93
(58) Field of Classification Search
USPC .......................................................... 701/93
See application file for complete search history.

(56) References Cited

U.S. PATENT DOCUMENTS

| 2002/0173881 | A1 | 11/2002 | Lash | |
| 2003/0204299 | A1* | 10/2003 | Waldis et al. | 701/96 |
| 2004/0030483 | A1* | 2/2004 | Muehlbauer | 701/93 |
| 2009/0138168 | A1* | 5/2009 | Labuhn et al. | 701/93 |

FOREIGN PATENT DOCUMENTS

| DE | 103 03 611 A1 | 8/2004 |
| DE | 10 2006 036 363 A1 | 4/2007 |
| DE | 10 2008 058 976 A1 | 7/2009 |

* cited by examiner

*Primary Examiner* — Ramsey Refai

(57) ABSTRACT

A method to selectively prevent a vehicle from resuming a vehicle set speed stored in memory of a cruise control system includes monitoring a vehicle speed, determining that the vehicle speed indicates operation in a low speed range, determining a threshold slow zone maneuver based upon the vehicle speed substantially remaining in the low speed range through a predetermined duration, and inhibiting resumption of the vehicle set speed based upon the threshold slow zone maneuver.

9 Claims, 7 Drawing Sheets

METHOD FOR PREVENTING ACTIVATION OF RESUME FUNCTION IN A CRUISE CONTROL SYSTEM

TECHNICAL FIELD

This disclosure is related to vehicle cruise control systems.

BACKGROUND

The statements in this section merely provide background information related to the present disclosure and may not constitute prior art.

Cruise control systems control a vehicle cruising speed to maintain a desired cruising speed of a vehicle. The cruise control systems are operatively connected to the vehicle engine and operate the engine automatically in order to maintain the desired cruising speed of the vehicle. Exemplary systems allow a driver to manipulate the cruise control using on/off, set/coast and resume/accelerate switches. The on/off switch enables the driver to turn the cruise control system on or off. The set/coast switch enables the driver to set a vehicle cruising speed in memory or coast while the cruise control system is on. If the cruise control system is on but not operating in cruise control, tapping the set/coast switch sets the vehicle speed in memory at the present vehicle speed and starts the vehicle operating in cruise control. Once the vehicle is operating in cruise control holding the set/coast switch depressed causes the vehicle to coast.

The driver can cause the vehicle to stop operating in cruise control by tapping the brake pedal. The resume/accelerate switch enables a driver to resume to vehicle speed in memory from another speed or accelerate the vehicle speed from vehicle speed in memory while operating in cruise control. For example, if the vehicle was operating in cruise control and the driver brakes, the resume function enables the driver to resume cruise control by automatically accelerating the vehicle back to the vehicle speed in memory. If the vehicle is operating in cruise to maintain the vehicle cruising speed in memory, the driver can hold the resume/accelerate switch depressed to accelerate the vehicle from vehicle speed in memory. Additionally, in exemplary systems the driver can tap the resume/accelerate switch to increase the vehicle speed in memory by one increment, for example, by one mile per hour (MPH) or the set/coast switch to decrease the vehicle speed in memory by one MPH.

Adaptive cruise control (ACC) automatically adjusts vehicle speed to maintain a driver-selected headway from the vehicle ahead in the same lane. The adaptive cruise control system can slow the vehicle down when slow moving traffic is encountered and resume the vehicle to an original set speed when the traffic clears. The adaptive cruise control system uses a ranging sensor to sense traffic ahead, as well as yaw and steering data to determine which targets are in the predicted path of the vehicle.

It is known, for example, to prevent activation of the resume function in adaptive cruise control system when the vehicle is traveling below a threshold low speed range. However, when vehicle speed is the only input, the resume function may be deactivated at undesirable times, such as in stop and go traffic, at stop lights and turning on to a different street. It is therefore desirable to incorporate additional inputs for selectively preventing activation of the resume function in adaptive cruise control systems, so that inappropriate inhibition of the resume function can be avoided or significantly reduced.

SUMMARY

A method to selectively prevent a vehicle from resuming a vehicle set speed stored in memory of a cruise control system includes monitoring a vehicle speed, determining that the vehicle speed indicates operation in a low speed range, determining a threshold slow zone maneuver based upon the vehicle speed substantially remaining in the low speed range through a predetermined duration, and inhibiting resumption of the vehicle set speed based upon the threshold slow zone maneuver.

BRIEF DESCRIPTION OF THE DRAWINGS

One or more embodiments will now be described, by way of example, with reference to the accompanying drawings, in which.

DETAILED DESCRIPTION

Figure 1:
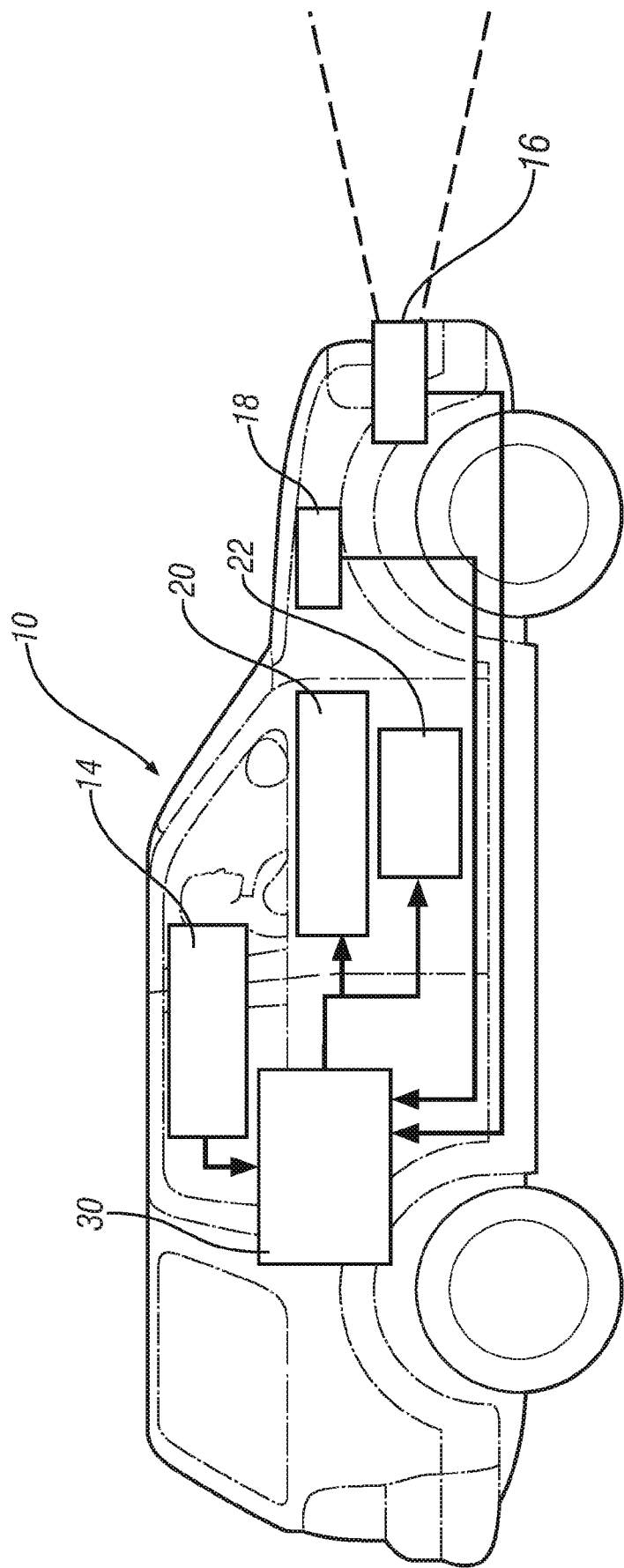
FIG. 1 schematically illustrates an exemplary vehicle equipped with an adaptive cruise control feature, in accordance with the present disclosure.

Referring now to the drawings, wherein the showings are for the purpose of illustrating certain exemplary embodiments only and not for the purpose of limiting the same, FIG. 1 schematically illustrates an exemplary host vehicle 10 equipped with an ACC feature 30. ACC feature 30 can be utilized to monitor inputs from various sources, prioritize control of vehicle velocity based upon the various inputs, and output velocity and acceleration control commands to a vehicle speed control system. ACC feature 30 accepts inputs from a driver input device 14, a ranging sensor device 16 such as radar, LIDAR, visual/camera, laser, or sonar monitoring systems, and vehicle sensors 18 returning information such as the velocity of host vehicle 10 to create acceleration outputs for controlling the forward velocity or speed of the host vehicle 10. Inputs from the driver input device 14 can include a number of inputs, including steering wheel angle, a monitored or determined wheel orientation, brake pedal position, and a driver commanded acceleration such as from an accelerator pedal position. The acceleration outputs from the ACC feature 30, in one embodiment, include commands for a powertrain control device 20 and braking system 22 based on the acceleration being positive or negative, respectively. Powertrain control device 20 can in one embodiment include engine control, such as through control of fuel injection, spark, and throttle device settings; however, it will be appreciated that a number of engine or powertrain control devices or modules are contemplated providing or controlling motive force to the host vehicle, for example, including commands to a hybrid powertrain or an electric powered powertrain, and the disclosure is not intended to be limited to the examples set forth in this disclosure. Similarly, braking system 22 is depicted as an exemplary system controlling deceleration or negative acceleration of the host vehicle; however, it will be appreciated that a number of devices or methods such as engine braking or regenerative braking in a hybrid powertrain are contemplated, and the disclosure is not intended to be limited to the examples set forth in this disclosure. In other exemplary embodiments, depending upon the particular cruise control functions being served, control only by throttle commands can be achieved. In other exemplary embodiments, for instance in relation to a hybrid drive powertrain or powertrain including electrical motors, the electrical motors can be used instead of or in cooperation with the engine to make adjustments to vehicle speed.

Control module, module, control system, control device, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
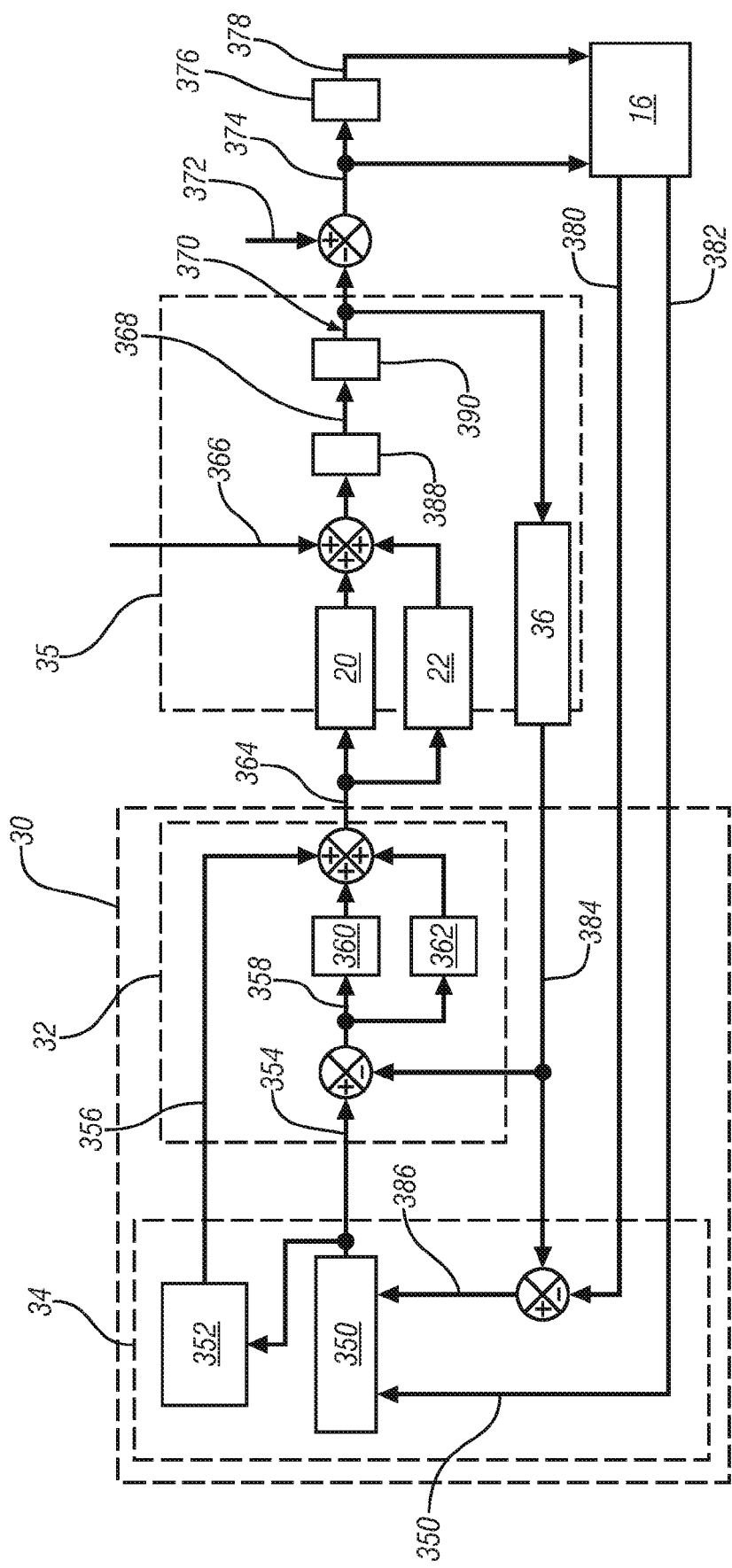
FIG. 2 schematically illustrates operation of an exemplary adaptive cruise control feature, in accordance with the present disclosure.

FIG. 2 schematically illustrates operation of an exemplary ACC feature 30. An ACC feature 30 can maintain a vehicle headway, which may, for example, be a preset value or function, may be driver selectable, or may be determinable based upon parameters such as vehicle speed or speed of the target vehicle, if a preceding vehicle is detected by ranging sensor device 16. In other embodiments, communication with other vehicles in traffic may be employed in order to set speeds and ranges among the vehicles and/or warn of oncoming conditions in traffic, e.g., through radio or satellite communication. The preceding vehicles or target vehicles are tracked in relation to the host vehicle based upon the input from the forward looking sensor or other device generating information about the target vehicles. It will be appreciated that such systems can optionally additionally employ a GPS device and digital map to augment or improve operation of the ACC feature 30, for example, providing details regarding a road geometry and travel parameters such as a speed limit proximate the host vehicle.

The ranging sensor device 16 can provide a range ($\hat{r}$ signal 382) and range rate ($\hat{\dot{r}}$ signal 380) for determining vehicle headway and an azimuth and azimuth rate for determining a target vehicle position. An ACC command generation block 34 monitors measured vehicle inputs such as vehicle velocity ($\hat{v}$ signal 384) generated by speed sensor 36, range ($\hat{r}$ signal 382), and range rate ($\hat{\dot{r}}$ signal 380). Speed sensor 36 is an example of a vehicle sensor 18 described in FIG. 1. The ACC command generation block 34 determines a target vehicle speed ($\hat{v}_T$ signal 386) based upon a difference in vehicle velocity ($\hat{v}$ signal 384) and range rate ($\hat{\dot{r}}$ signal 380). The ACC command generation block 34 generates desired velocity ($v_{ACC}$ signal 354) and desired acceleration ($a_{ACC}$ signal 356) and outputs the data for a speed controller 32. The desired acceleration ($a_{ACC}$ signal 356) can be developed according to a number of inputs, for example, based upon preferences of the operator, functional characteristics of the host vehicle, a difference between vehicle velocity ($\hat{v}$ signal 384) and desired velocity ($v_{ACC}$ signal 354), information regarding current road or traffic conditions, or other factors affecting acceleration of a vehicle upon a roadway. The speed controller 32 determines an acceleration command ($a_{cmd}$ signal 364) as an output which is input to a vehicle speed control system 35 to control an exemplary vehicle including the powertrain control device 20 and braking system 22. Exemplary operation of speed controller 32 includes determining an error signal 358 from between vehicle velocity ($\hat{v}$ signal 384) and desired velocity ($v_{ACC}$ signal 354), applying a proportionate gain 360 and an integral gain 362, and summing the error gain values and desired acceleration ($a_{ACC}$ signal 356) to determine the acceleration command ($a_{cmd}$ signal 364). Under exemplary operation, if the acceleration command ($a_{cmd}$ signal 364) is positive, powertrain control device 20 is commanded to create a positive vehicle acceleration, and if the acceleration command ($a_{cmd}$ signal 364) is negative, braking system 22 is commanded to create a negative vehicle acceleration. Negative acceleration of the host vehicle also can be accomplished through the powertrain control device. In one embodiment, vehicle speed control system 32 could use a combination of the powertrain control device and the braking system to achieve a particular deceleration. Actual vehicle velocity v can be increased and decreased to maintain a desired vehicle headway. As depicted in FIG. 2, target vehicle speed ($\hat{v}_T$ signal 386) depicts a velocity of the target vehicle being tracked and disturbance force ($F_d$ signal 366) depicts a disturbance force, such as a headwind force, bumpiness from the road, a gravitational force on an incline, or any force that affects the force needed to propel the host vehicle. Operation of powertrain control device 20 and braking system 22, in combination with disturbance force ($F_d$ signal 366), affect changes to actual vehicle operation. Such changes to actual vehicle operation can be modeled as (a signal 368) and (v signal 370), determinable through calculation blocks 388 and 390. Further, based upon the actual target vehicle velocity ($v_T$ signal 372) a range (r signal 378) and a range rate ($\dot{r}$ signal 374) can be determined.

One having ordinary skill in the art will appreciate that ACC feature 30 enables a host vehicle 10 to operate at a desired velocity, and, in the course of travel, decrease velocity as a target vehicle in front of the host vehicle requires the host vehicle 10 to slow to maintain the vehicle headway. It will further be appreciated that such a host vehicle 10 typically includes a resume function, whereby, when the target vehicle is no longer inhibiting the forward travel of the host vehicle 10, the host vehicle 10 accelerates to resume a desired velocity, for example, resuming the desired velocity set before the target vehicle caused the host vehicle 10 to slow. It will be appreciated, however, that the target vehicle no longer blocking the host vehicle 10 from accelerating is not the only factor that can be considered necessary to make travel at the former desired velocity acceptable. For example, the host vehicle 10 might have traveled to a section of road with a lower speed limit. In another example, a particular road geometry or traffic pattern might make activation of the resume function inappropriate. For example, if a target vehicle in front of host vehicle 10 turns within an intersection, activation of the resume function within the intersection and the corresponding acceleration, regardless of traffic signals or the state of the intersection, can be undesirable.

In another example, the host vehicle 10 might have departed the roadway and currently be traveling in a low speed environment, for example, a parking lot including stopped vehicles and pedestrian traffic whereupon operation of adaptive cruise control is inappropriate or undesirable.

Figure 3:
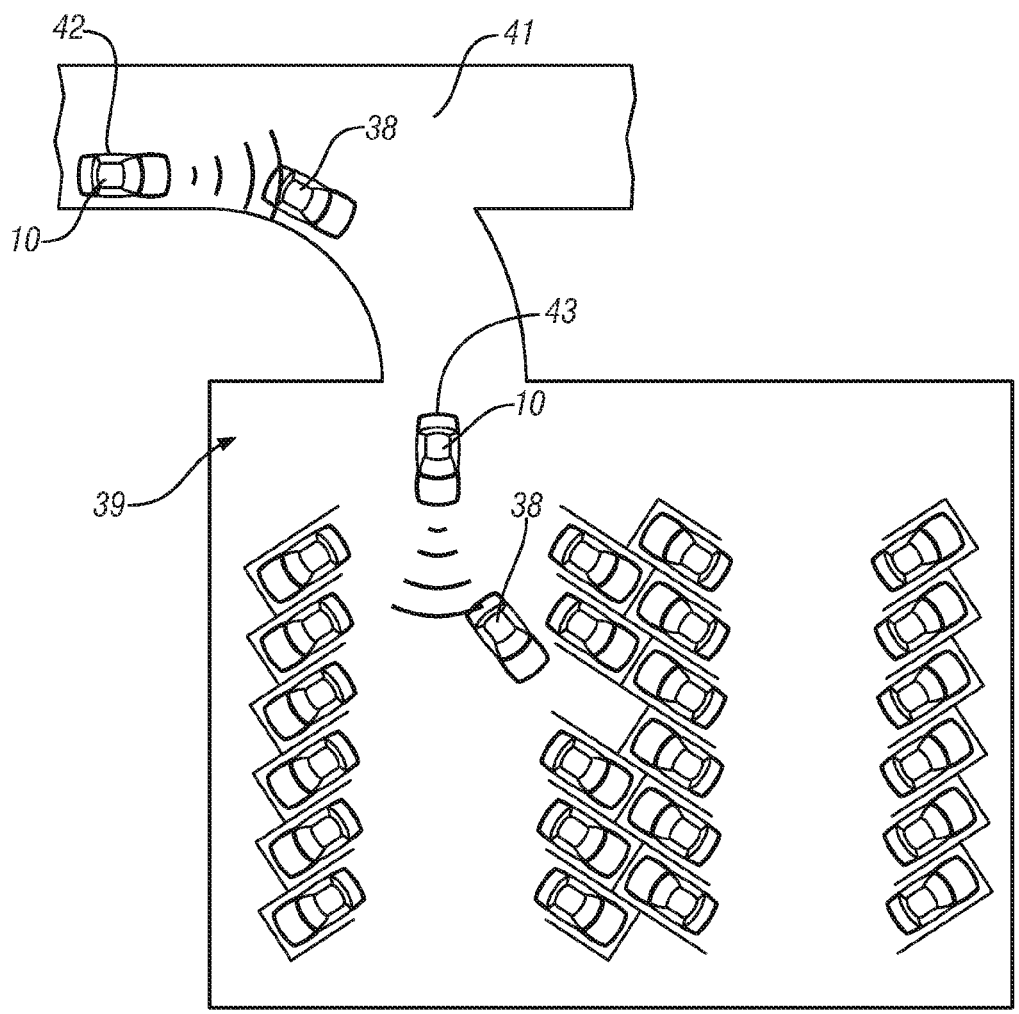
FIG. 3 depicts an exemplary host vehicle following a target vehicle into a low speed maneuvering environment, in accordance with the present disclosure.

In an exemplary embodiment, FIG. 3 depicts an illustration of a host vehicle 10 following a preceding vehicle 38 into a low speed maneuvering environment 39. In a non-limiting example, the host vehicle 10 is following the target vehicle 38 along a roadway 41 at point 42, wherein $V_D$ (set or desired speed)=v=$V_T$ (target vehicle speed)=50 MPH. At point 43, the host vehicle 10 and target vehicle 38 travel to a parking lot (slow maneuvering environment 39), wherein the speed of the host vehicle v is equal to $V_T$=10 MPH. Subsequently, the target vehicle 38 parks in a parking space. The host vehicle 10 is no longer following the preceding 38 vehicle when the preceding 38 vehicle parks. At point 43, in the slow maneuvering environment 39 such as the parking lot, it is undesirable for the adaptive cruise control system to activate the resume function to $V_D$, wherein the host vehicle 10 would accelerate to 50 MPH. Additionally, in vehicles comprising traditional cruise control, where the resume function is activated by the driver depressing a button, it would be undesirable for the host vehicle to rapidly accelerate if the driver accidentally depressed a resume button while operating the host vehicle in the slow maneuvering environment 39.

Figure 4:
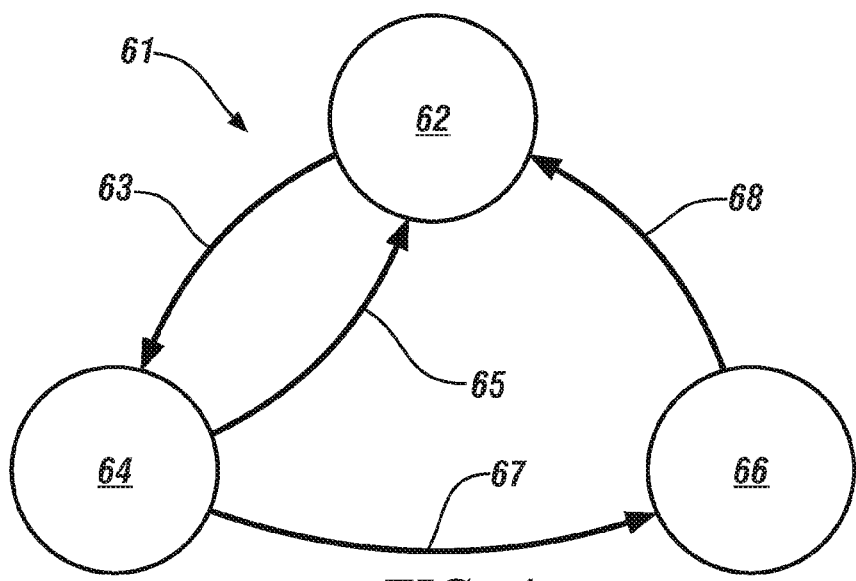
FIG. 4 depicts a state diagram illustrating an exemplary method to selectively prevent activation of a resume function in an adaptive cruise control system, in accordance with the present disclosure.

FIG. 4 illustrates a state diagram depicting an exemplary system for selectively preventing activation of the resume function in an adaptive cruise control system, in accordance with the present disclosure. Operation of the system is performed by the ACC feature 30 shown in FIG. 1. The system 61 includes a disarmed state 62, an armed state 64 and a triggered state 66. In disarmed state 62, the system cannot be directly triggered to limit a cruise control resume function. Upon occurrence of a condition to arm the system, system 61 can advance through transition 63 to the armed state 64. In the exemplary embodiment represented in FIG. 4, the transition to the armed state 64 is enabled by the host vehicle operating in a threshold low speed range. In the armed state 64, the system can transition through transition 65 to the disarmed state 62 upon occurrence of a disqualifying condition, such as the host vehicle exiting the exemplary threshold low speed range or the host vehicle failing to meet triggering conditions during some time or distance duration. In the event the host vehicle completes a threshold slow zone maneuver, upon occurrence of vehicle operation meeting triggering conditions indicating that the host vehicle is likely in an environment wherein activation of a resume function would be undesirable, the system can transition through transition 67 to the triggered state 66, wherein the system inhibits operation of the resume function. Triggering conditions are selected to describe conditions indicating vehicle operation in an environment where the host vehicle resuming to a higher set speed could be undesirable. In the triggered state 66, the system operates as described herein until a transition condition is met to move the system through transition 68 to the disarmed state 62. In FIG. 4, exemplary conditions to transition the system to disarmed state 62 are described to include the host vehicle being operated manually to exit the threshold low speed range or the current vehicle trip ending. System 61 is an exemplary representation of how the methods and systems described herein can be employed. However, it will be appreciated that such methods and systems can be exhibited in numerous embodiments, and the disclosure is not intended to be limited to the particular examples described herein.

Figure 5:
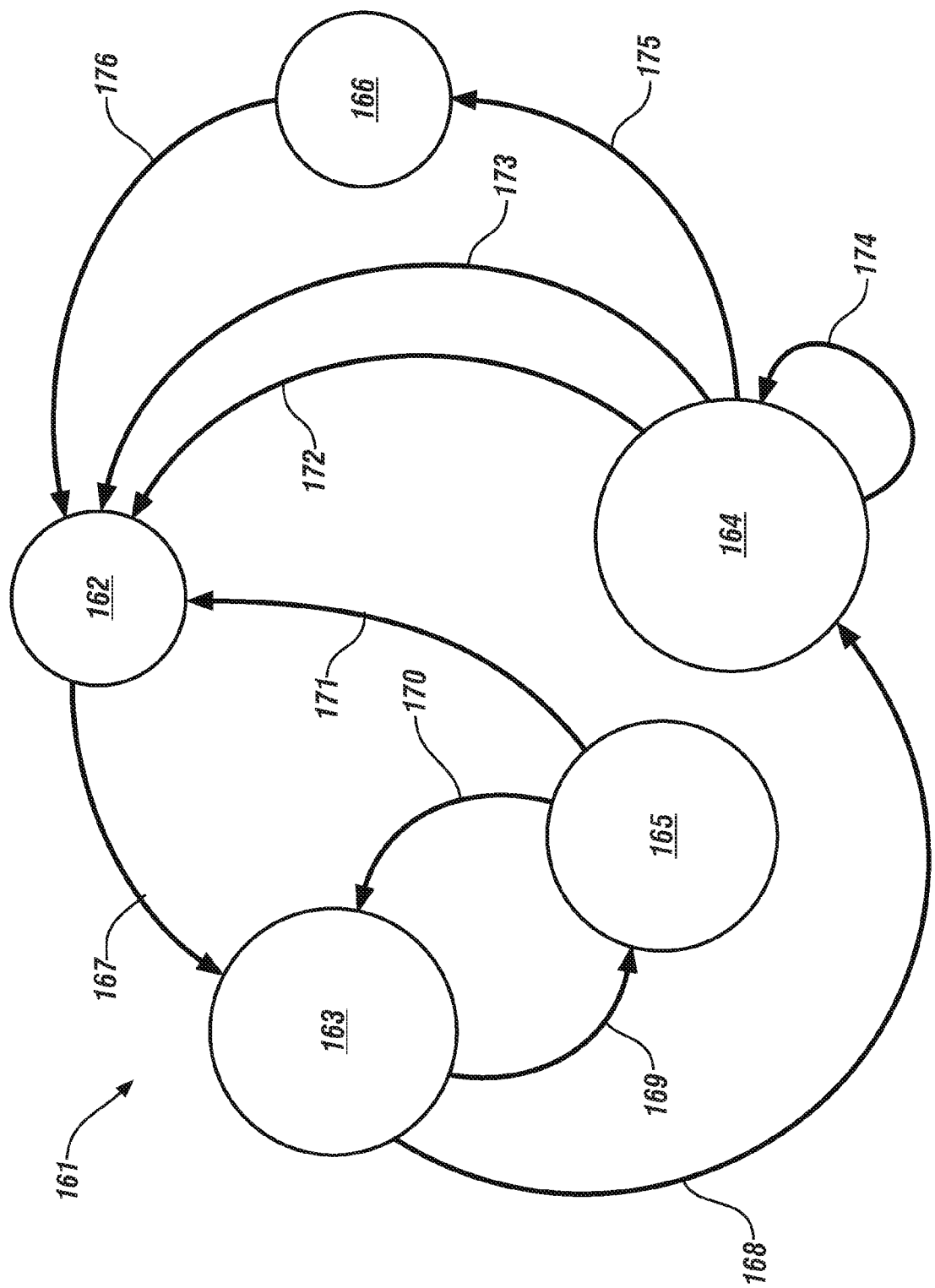
FIG. 5 depicts a state diagram illustrating an additional exemplary method to selectively prevent activation of a resume function in an adaptive cruise control system, in accordance with the present disclosure.

FIG. 5 illustrates a state diagram depicting another exemplary system for selectively preventing activation of the resume function in an adaptive cruise control system, in accordance with the present disclosure. Operation of the system 161 is performed, for example, by the ACC feature 30 shown in FIG. 1. The system 161 includes a disarmed state 162, a first attempting to arm state 163, a second attempting to arm state 165, an armed state 164 and a triggered state 166. When the system starts in or determines that the host vehicle is in the disarmed state 162, the host vehicle is traveling outside of a threshold low speed range and is monitoring for occurrence of conditions to transition to the first attempting to arm state 163. When the system 161 is in the disarmed state 162, there is no indication that the host vehicle is operating in a slow maneuvering environment, such as a parking lot, or soon may be operating in a slow maneuvering environment where preventing activation of the resume function in an adaptive cruise control system would be desired. The system 161 transitions through transition 167 to the first attempting to arm state 163 when the host vehicle operates within a low speed range, in this exemplary embodiment, wherein the host vehicle speed falls between zero and 15 MPH. If the system 161 determines that the host vehicle has met certain transition conditions, in the example, traveling an arming distance while remaining within a low speed range or traveling within the low speed range for a threshold time period, the system 161 transitions through transition 168 to the armed state 164. If however, the system 161 determines that the host vehicle travels outside of the low speed range before traveling the arming distance, the system transitions through transition 169 to the second attempting to arm state 165. In a one example, the arming distance is 50 meters and the low speed range is between 1 and 15 MPH. This arming distance, or the distance that the host vehicle must travel in the low speed range for the system to be armed, can be determined by monitoring a distance traveled while the host vehicle is substantially in the low speed range, comparing the distance traveled to a minimum distance traveled threshold, and permitting the system to be armed when the distance traveled exceeds the threshold.

If the system 161, operating in the second attempting to arm state 165, determines that the host vehicle is traveling outside of the low speed range for at least a minimum time, the system transitions through transition 171 back to the disarmed state 162. If however, the speed of the host vehicle returns to a speed within the low speed range and within the minimum time, the system 161 transitions operation through transition 170 back to the first attempting to arm state 163. The system 161 repeats the process as discussed above while operating in the first attempting to arm state 163. In a non-limiting example, the minimum time is 1 second.

In armed state 164, system 161 iteratively monitors operation of the host vehicle to determine whether conditions necessary for a number of transitions are met. Transition 174 describes the host vehicle continuing to operate under the threshold speed for less than a maximum or threshold distance and/or not yet meeting a threshold turn. If the system 161, operating in the armed state 164, determines that conditions necessary to transition to the triggered state 166 are met, indicating occurrence of a threshold slow zone maneuver, the system transitions through transition 175 to triggered state 166. However, if the conditions necessary to transition to the triggered state 166 are not met within a set time or distance duration (transition 172) or the host vehicle enters a speed range wherein operation of the resume function is appropriate (transition 173), then the system transitions to disarmed state 162. In the exemplary embodiment of FIG. 5, a condition necessary to transition from the armed state 164 to the triggered state 166 includes the host vehicle performing a turn greater than or equal to a set angle, in this example, greater than or equal to 45 degrees, within a set distance, in this example, 125 meters. The set distance in which the triggering conditions must be met can be monitored by monitoring a distance traveled, comparing the distance traveled to a threshold slow zone maximum distance, and permitting the system to be triggered based upon the monitored distance remaining less than the threshold. It should be noted that the monitored turn or turning maneuver and the time or distance duration in which the qualifying turn to trigger system 161 must take place can take a number of embodiments. In one example, the turn can be monitored and the duration can accrue after the system is armed, with turns and duration occurring before the arming not counting toward the qualifying turn. In another example, the turn can be monitored and the duration can accrue from the start of the system attempting to arm. In such a system and in certain embodiments, the system can have met some or all of the necessary trigger conditions prior to the system arming, such that the system moves to the triggered state 166 as soon as the system arrives at the armed state 164. The system can monitor a first and a second turning maneuver, requiring each to be met in order to meet the triggering conditions. These plural maneuvers can be distinctly measured and occur one after the other. In other embodiments, they could be measured as part of a single accrued turning angle, or could include a single unbroken turn, for example, with a single ninety degree turn satisfying a requirement for two forty five degree turns. In the exemplary embodiment of FIG. 5, conditions to transition the system to the disarmed state 162 include the host vehicle operating at above a threshold speed, in this example, above 18 MPH, and the host vehicle failing to perform a qualifying turn within the set distance from the system being armed.

It should also be appreciated that a turning maneuver can be any change in the heading of the host vehicle. A sensor within the host vehicle can measure the yaw rate of the host vehicle to calculate changes in the host vehicle heading. Yaw rate measures the host vehicle's rate of rotation, in degrees per second, around its vertical axis and thereby can be integrated to determine the angle turned by the vehicle during an interval. Similarly, it is known that steering wheel angle and vehicle speed can be utilized together in place of yaw rate to determine the angle turned. Similarly, a monitored or determined wheel angle describing a degree to which the wheels of the host vehicle are turned can be utilized.

When the system is operating in the triggered state 166, the resume function of the adaptive cruise control is prevented from activating. Hence, the system 161 has determined that the host vehicle is likely to be operating in a slow maneuvering environment, such as a parking lot. However, any time the host vehicle accelerates to at least a maximum speed, the system 161 shifts operation to the disarmed state 162. Similarly, if the host vehicle has ended a current vehicle trip, the system can be transitioned to the disarmed state 162. An indication that the host vehicle trip has ended can include any indication that the host vehicle has ceased to travel as opposed to the host vehicle just pausing in traffic. Example indicators that can trigger a trip end indication include a key off event, the transmission being shifted into park, vehicle doors opening, and/or a parking brake being engaged. It should be appreciated that the system 161 can be re-armed and triggered repeatedly during a vehicle trip.

Figure 6:
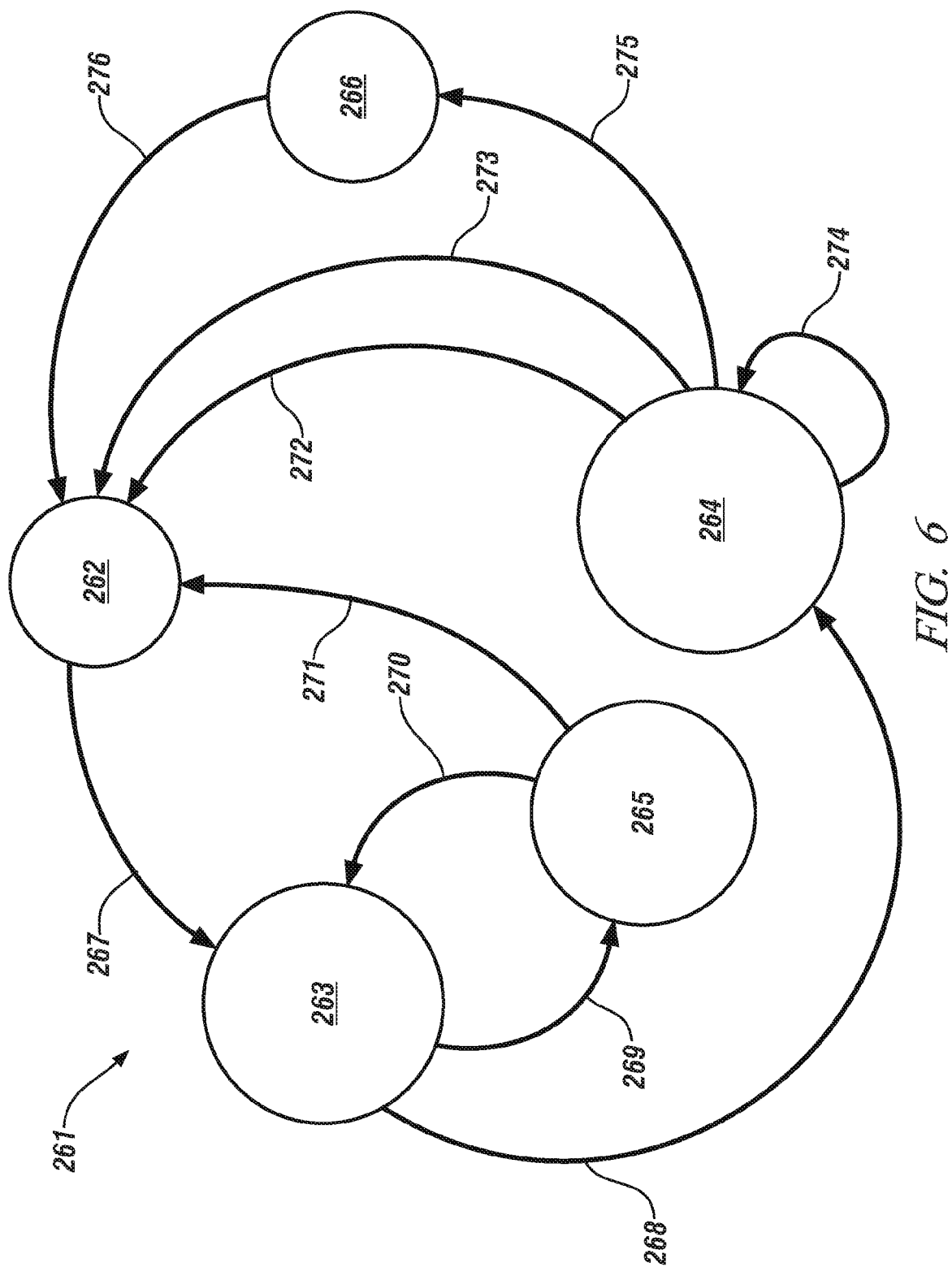
FIG. 6 depicts a state diagram illustrating an additional exemplary method to selectively prevent activation of a resume function in an adaptive cruise control system, in accordance with the present disclosure.

FIG. 6 illustrates a state diagram depicting another exemplary system for selectively preventing activation of the resume function in an adaptive cruise control system, in accordance with the present disclosure. Operation of the system 261 is performed, for example, by the ACC feature 30 shown in FIG. 1. The system 261 includes an unarmed state 262, a first attempting to arm state 263, a second attempting to arm state 265, an armed state 264 and a triggered state 266. System 261 operates similarly to system 161, with operating states 262-266 operating similarly to corresponding operating states 162-166. Many of the defined transitions also operate similarly between system 161 and system 261. Transition 267 requires the host vehicle to operate within a low speed range. Transition 269 requires that the host vehicle exit the low speed range. Transition 270 requires that the host vehicle reenter the low speed range within a threshold time. Transition 271 requires that the host vehicle not reenter the low speed range within the threshold time. Transition 268 requires that the host vehicle speed remain within the low speed range through a minimum distance traveled. System 261 illustrates operation of a different condition to transition from the armed state 264 to the triggered state 266, wherein the transition requires two turns, each turn corresponding to the host vehicle performing a turn greater than or equal to a set angle, in this example, greater than or equal to 45 degrees, within a set distance of the system being armed, in this example, 125 meters. It will be appreciated that this trigger indicating a threshold slow zone maneuver can take a number of different forms and can utilize different sensors or techniques individually or cooperatively to identify a slow driving environment, and the disclosure is not intended to be limited to the particular embodiments described herein. Transition 275 requires that this trigger take place. Transition 272 requires that the trigger not take place within a threshold distance. Transition 273 requires that the host vehicle exceed a threshold speed, for example, 18 MPH. Transition 276 requires that the host vehicle exceed a threshold speed or that the host vehicle trip has ended. Further, it will be appreciated that a number of methods, for example, monitoring different trigger events, can be employed by the same vehicle simultaneously.

Figure 7A:
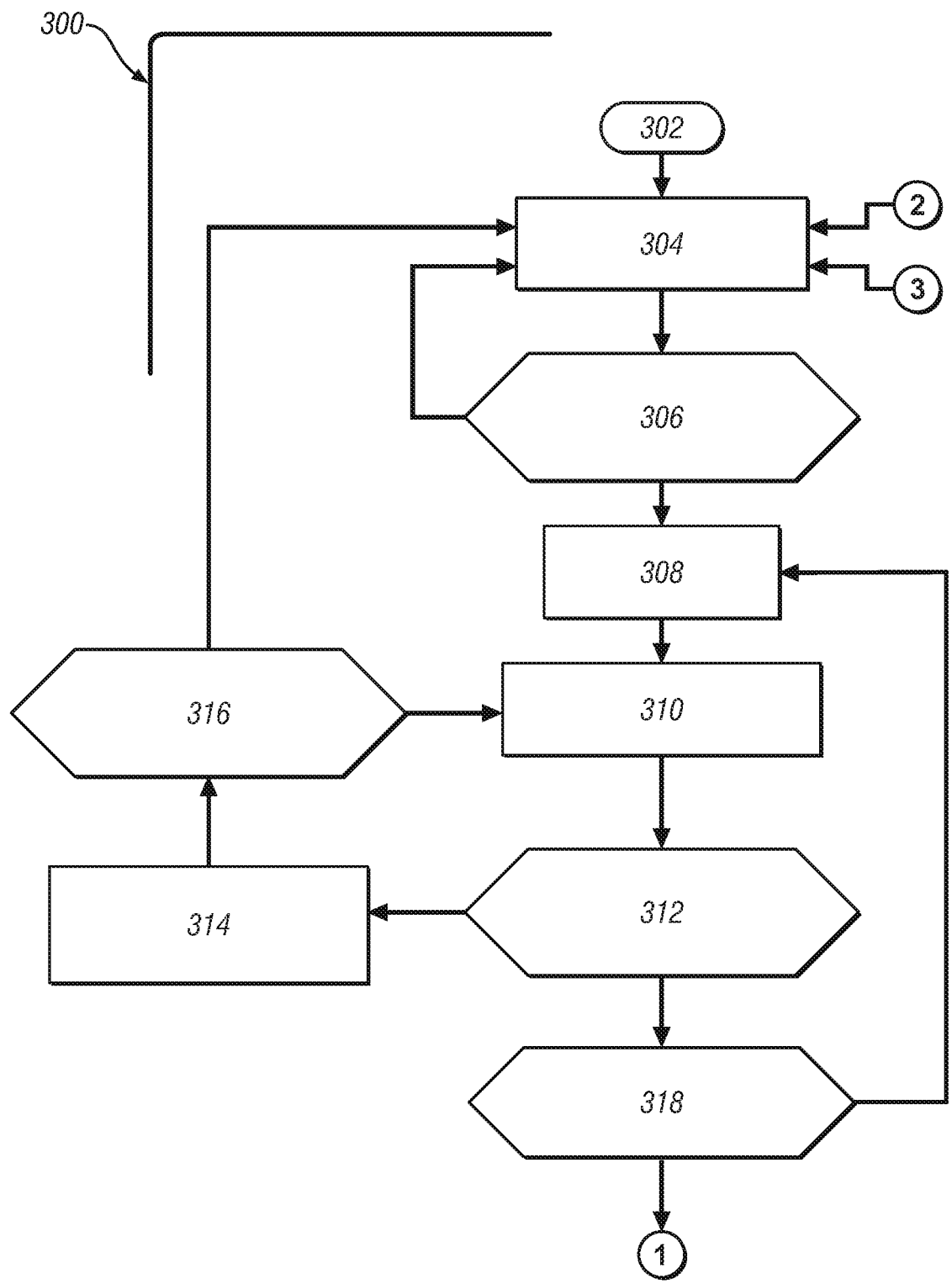
FIGS. 7A and 7B depict an exemplary flowchart of an exemplary process to selectively prevent activation of a resume function in an adaptive cruise control system, in accordance with the present disclosure.
Figure 7B:
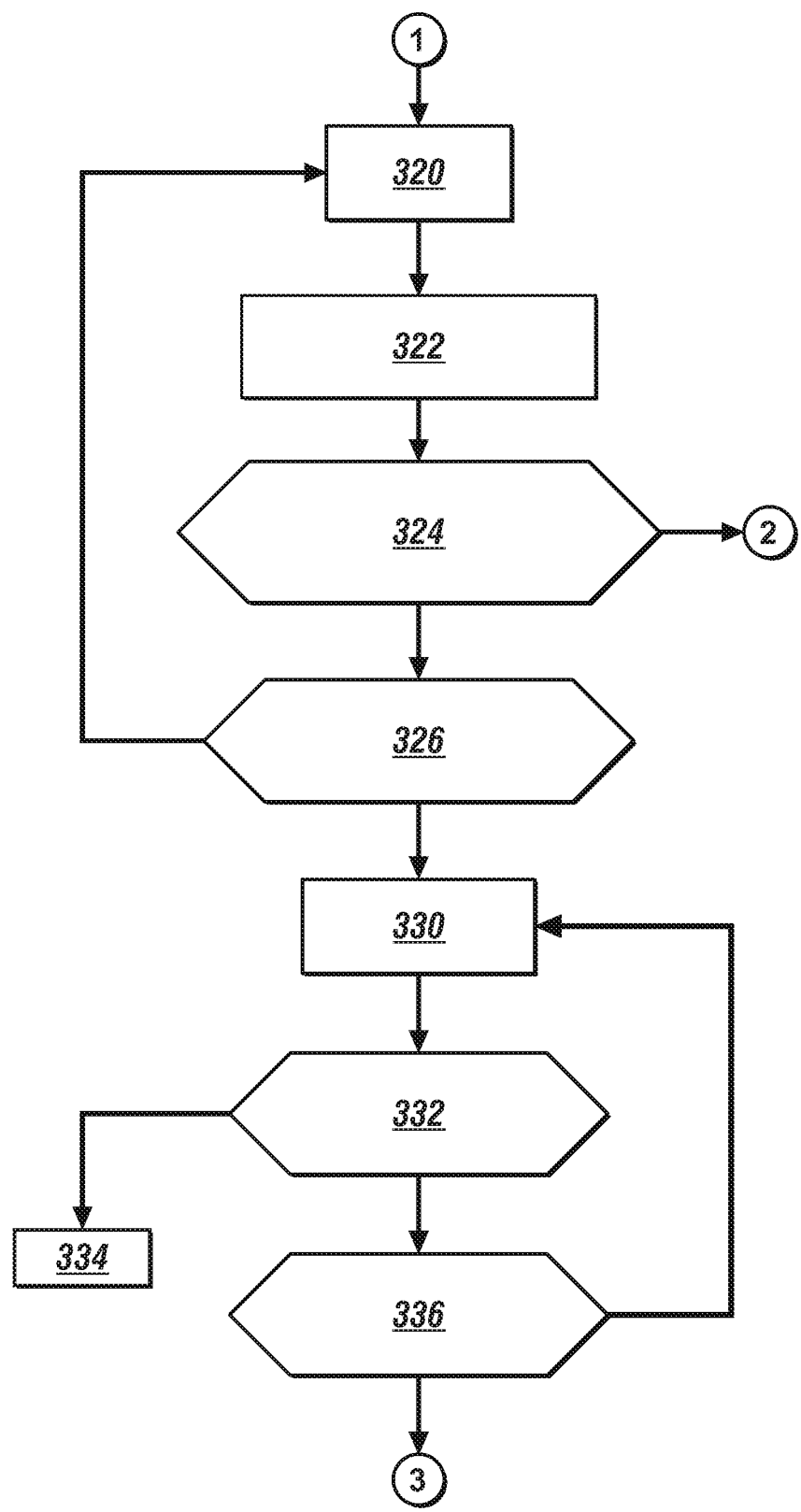

FIGS. 7A and 7B collectively depict an exemplary flowchart describing an exemplary process to selectively prevent activation of a resume function in an adaptive cruise control system, in accordance with the present disclosure. Process 300, describing a cruise control resume prevention function, starts at block 302. At block 304, the system is in a disarmed state and all accumulated terms are reset to zero. At block 306, the host vehicle speed is checked to see if it is within a particular range, in this case, between zero and 15 MPH. If the speed is not within this range, the process returns to block 304. If the speed is within the range, then the process advances to block 308. At block 308, the system is in an attempting to arm state. At block 310, accumulation of a distance traveled and accumulation of a turn angle are started or iterated. In block 312, the host vehicle speed is checked to see if it remains within a particular range, in this case, between 1 and 15 MPH. If the host vehicle speed is within the range, the process advances to block 318. If the host vehicle speed is not within the range, the process advances to block 314, wherein the system is in a trying to recover from speed out of range state. From block 314, the process advances to block 316, wherein the time that the host vehicle speed has been out of range is examined If the time exceeds a maximum low speed violation time threshold, in this example 1 second, the process returns to block 304. If the time is less than the threshold, then the process returns to block 310. In block 318, the distance traveled is examined, and if the threshold exceeds a threshold, the process advances to block 320 in FIG. 7B. If the distance traveled does not yet exceed the threshold, the process returns to block 308. At block 320, the system is in an armed state. At block 322, the distance traveled and turn angle initiated in block 310 are continued to be accumulated. It will be appreciated that the distance traveled and turn angle can be single terms throughout the process or new terms can be initiated and accumulated from zero at block 322. Selection of the method to accumulate these terms can be selected based upon any method sufficient to predict and control desired operation of the host vehicle. At block 324, the distance traveled and the host vehicle speed are compared to thresholds, in this case, 120 meters and 18 MPH, respectively. The distance threshold, a threshold slow zone maximum distance, limits the distance that the host vehicle can travel while remaining in the armed state. This distance reflects a finite size of slow zone areas such as parking lots and avoids the system remaining armed over long ranges of road travel. The host vehicle speed threshold is based upon operating the system in an armed state only while the host vehicle remains reasonably close to the low speed range. If both thresholds are met, then the system remains armed and the process advances to block 326. If either threshold is not met, then the system returns to block 304. At block 326, the turn angle is compared to a threshold turn angle, in this case, 45 degrees. This turn angle operates as a threshold slow zone maneuver or criteria useful to distinguish operation that likely indicates the host vehicle departing from a roadway to a slow speed zone such as a parking lot or turning between the lanes within a parking lot. If the turn angle is greater than the threshold, then the process advances to block 330. If the turn angle is less than the threshold, the process returns to block 320. It should be noted that this threshold turn angle can be selected as any value describing a significant turn at slow speeds that could indicate that the host vehicle has departed from a main road into a different driving environment or that it is turning within a parking lot. Other exemplary numbers could include 40, 50, 60, or 70 degrees, but the disclosure is not intended to be limited to these examples. At block 330, the system is triggered in accordance with methods described herein, and a resume function in the host vehicle cruise control is blocked. At block 332, the host vehicle ignition is checked. If the host vehicle ignition is turned off, the process ends at block 334. If the host vehicle ignition is not turned off, the process advances to block 336. At block 336, the host vehicle speed is check against a low speed threshold describing travel in a slow speed environment, in this example, 18 MPH. If the host vehicle speed is below the threshold, the process returns to block 330. If the host vehicle speed is not below the threshold, then the process returns to block 304. In this way, methods described herein to block a resume function in a cruise control system in conditions indicative of a slow speed environment can be operated.

It will be appreciated that the various specific thresholds and speed zones described above can vary depending upon vehicle type, road configurations in different geographical regions, or other considerations that describe how a vehicle would typically operate in different driving environments. Such variations can be changed in the host vehicle dynamically depending upon information available to the system.

It will be appreciated that methods described herein can be augmented with additional criteria, for example, utilizing radar returns in the host vehicle 10 to confirm a slow speed environment. For example, if the host vehicle is in an armed state and radar returns in the host vehicle describe lines of stationary vehicles consistent with a parking lot, the system can be triggered, allowed to trigger with a lesser threshold turn angle, or remain in the armed state for a longer distance threshold, as described in the above methods. A camera device utilizing pattern recognition software known in the art can be utilized similarly to identify objects matching a predetermined pattern consistent with a slow speed environment. Similarly, a GPS device with a map database can be utilized to modify or aid in triggering an armed system in areas identified to be likely slow speed environments. As is known in the art, a GPS device provides a three dimensional coordinate of the device, and this coordinate can be utilized with a digital map database to describe the location of the host vehicle. For example, in a particular location, if the system on a number of occasions fails to trigger, but the resume function is on more than one occasion met with a manual override of the resume function, such as a quick brake pedal depression by the operator, a process, for example, a machine learning algorithm in a control module, can be utilized to increase occurrence of triggering the system at that location. The control module, the cruise controller, or some other device could retain a record of such manual overrides of the resume function and correlate the occurrences of the manual overrides to a described vehicle location for each occurrence. In another example, special low speed zones, such a school zones or hospital areas, can be utilized to more aggressively apply thresholds for arming and triggering the system. Similarly, an operator can directly input whether the triggering of the system is appropriate at a particular location through human interface devices known in the art. While methods such as radar, camera, GPS, or other methods can be utilized to increase an occurrence of arming or triggering the system, one having ordinary skill in the art will appreciate that using such methods to make arming or triggering less likely should be used sparingly, if at all. Triggering the system too frequently, blocking activation of the resume function, can be a tolerable condition for the driver, but allowing a resume function in an actual slow speed environment can be less tolerable.

A number of adaptive cruise control systems are known. For example, a full speed range adaptive cruise control system can include a resume function from any speed including a stopped condition. The methods described herein can work with such a system. Other adaptive cruise control systems include a minimum operating speed from which a resume function can be operated. For example, an ACC feature 30 could include a minimum speed of 10 MPH, such that operation at 5 MPH will not allow a resume function. The methods described herein can be used with such a system, for example, allowing or selectively preventing activation of the resume function in a low speed range defined between 10 and 20 MPH. A number of adaptive cruise control embodiments are envisioned that can utilize the methods described above, and the disclosure is not intended to be limited to the particular examples provided herein.

The methods above describe preventing operation of a resume function, returning a vehicle to a speed in memory, based upon monitoring a threshold slow zone maneuver. Such a threshold slow zone maneuver can take many forms. As described above, a threshold slow zone maneuver can include the host vehicle traveling in a low speed range for a particular duration. Alternatively, a threshold slow zone maneuver can include a turn or a plurality of turns of a certain magnitude.

Alternatively, a threshold slow zone maneuver can include secondary considerations such as detected objects or a GPS indicated location. A number of exemplary threshold slow zone maneuvers are envisioned, and the disclosure is not intended to be limited to the particular exemplary embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A control module-implemented method to selectively prevent a vehicle from resuming a vehicle set speed stored in memory of a cruise control system, comprising:
   the control module configured to execute the following steps, comprising:
      monitoring a vehicle speed;
      monitoring an accumulated distance traveled by the vehicle when the vehicle speed is within a low speed range;
      only when the vehicle speed no longer remains within the low speed range for an elapsed time period exceeding a maximum low speed violation time threshold, resetting the monitored accumulated travel distance until the monitored vehicle speed is within the low speed range;
      only when the vehicle speed is within the low speed range;
         comparing the accumulated distance to a minimum travel distance; and
         only when the accumulated distance exceeds the minimum travel distance, monitoring a vehicle turning maneuver; and
      only when the vehicle speed is less than a predetermined vehicle speed threshold, wherein the predetermined vehicle speed threshold is greater than an upper limit of the low speed range:
         comparing the accumulated distance to a threshold slow zone maximum distance; and
         only when the accumulated distance does not exceed the threshold slow zone maximum distance, comparing the vehicle turning maneuver to a threshold slow zone maneuver; and
      selectively preventing resumption of the vehicle set speed if the vehicle turning maneuver exceeds the threshold slow zone maneuver.

2. The method of claim 1, further comprising:
   after the vehicle travel distance exceeds the minimum travel distance;
      monitoring a second vehicle travel distance while the vehicle speed remains substantially within the low speed range,
      comparing the second vehicle travel distance to a maximum travel distance, and
      selectively preventing resumption of the vehicle set speed further based upon the second vehicle travel distance remaining less than the maximum travel distance.

3. The method of claim 1, further comprising:
   monitoring stationary objects in proximity to the vehicle;
   comparing the stationary objects with a predetermined pattern of objects; and
   selectively preventing resumption of the vehicle set speed further based upon the stationary objects being consistent with the predetermined pattern of objects.

4. The method of claim 1, further comprising:
   monitoring data from a GPS system;
   determining a likely low speed zone location based upon the monitored data from the GPS system; and
   selectively preventing resumption of the vehicle set speed further based upon the likely low speed zone location.

5. The method of claim 1, wherein monitoring the vehicle turning maneuver comprises:
   monitoring a vehicle yaw rate;
   determining an angle turned by the vehicle based upon the vehicle yaw rate; and
   wherein comparing the vehicle turning maneuver to the threshold slow zone maneuver comprises comparing the angle turned by the vehicle to a predetermined turn angle threshold.

6. The method of claim 1, wherein monitoring the vehicle turning maneuver comprises:
   monitoring a vehicle yaw rate;
   determining a first angle turned by the vehicle based upon the vehicle yaw rate;
   determining a second angle turned by the vehicle based upon the vehicle yaw rate; and
   wherein comparing the vehicle turning maneuver to the threshold slow zone maneuver comprises comparing the first and second angles turned by the vehicle to a predetermined turn angle threshold; and
   wherein the vehicle turning maneuver exceeds the threshold slow zone maneuver when both the first and second angles turned by the vehicle exceed the predetermined turn angle threshold.

7. The method of claim 1, wherein monitoring the vehicle turning maneuver comprises:
   monitoring a wheel angle; and
   wherein comparing the vehicle turning maneuver to the threshold slow zone maneuver comprises comparing the wheel angle to a predetermined wheel angle threshold.

8. The method of claim 1, wherein selectively preventing resumption of the vehicle set speed comprises selectively preventing a resume function in an adaptive cruise control feature with a minimum operating speed.

9. The method of claim 1, wherein selectively preventing resumption of the vehicle set speed comprises selectively preventing a resume function in a full speed range adaptive cruise control system.

* * * * *